United States Patent
Kofuji

(10) Patent No.: US 7,913,793 B2
(45) Date of Patent: Mar. 29, 2011

(54) SHAFT-DRIVEN MOTORCYCLE WITH PIVOTALLY MOUNTED SWING ARM AND RELATED SUPPORT STRUCTURE

(75) Inventor: Kenji Kofuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 210 days.

(21) Appl. No.: 12/221,655

(22) Filed: Aug. 5, 2008

(65) Prior Publication Data

US 2009/0057046 A1 Mar. 5, 2009

(30) Foreign Application Priority Data

Aug. 27, 2007 (JP) ................................ 2007-220087

(51) Int. Cl.
*B62D 61/02* (2006.01)
(52) U.S. Cl. ........................................ 180/226; 180/227
(58) Field of Classification Search .................. 180/219, 180/226, 227
See application file for complete search history.

(56) References Cited

U.S. PATENT DOCUMENTS

| 7,510,040 B2* | 3/2009 | Takayanagi et al. | 180/226 |
| 7,644,797 B2* | 1/2010 | Kofuji | 180/227 |
| 7,665,562 B2* | 2/2010 | Utsumi et al. | 180/226 |
| 7,717,213 B2* | 5/2010 | Ito et al. | 180/227 |
| 7,730,988 B2* | 6/2010 | Igarashi et al. | 180/227 |

FOREIGN PATENT DOCUMENTS

JP 2002-087364 3/2002

\* cited by examiner

*Primary Examiner* — Kevin Hurley
(74) *Attorney, Agent, or Firm* — Carrier Blackman & Associates, P.C.; Joseph P. Carrier; William D. Blackman

(57) ABSTRACT

A motorcycle includes a swing arm, which is swingably supported on a vehicle body frame by a support member. A suspension link member is connected between a lower portion of the vehicle body frame and the swing arm, and a rear shock absorber is disposed extending between the suspension link member and an upper portion of the vehicle body frame. A rear wheel of the motorcycle is rotatably supported on a rear end of the swing arm, and the wheel is driven by a drive shaft extending through a hollow bore formed in the swing arm. The suspension link member is connected between a portion of the swing arm and a lower portion of the vehicle body frame, such that the portion of the swing arm which houses the drive shaft is positioned above the support member for the vehicle body frame.

14 Claims, 13 Drawing Sheets

SHAFT-DRIVEN MOTORCYCLE WITH PIVOTALLY MOUNTED SWING ARM AND RELATED SUPPORT STRUCTURE

CROSS-REFERENCE TO RELATED APPLICATIONS

The present application claims priority under 35 USC §119 based on Japanese patent application No. 2007-220087, filed on Aug. 27, 2007. The entire subject matter of this priority document is incorporated by reference herein.

BACKGROUND OF THE INVENTION

1. Field of the Invention

The present invention relates to a motorcycle having a swing arm with a hollow bore formed therethrough, to accommodate a drive shaft for driving a rear wheel of the motorcycle. More particularly, the present invention relates a shaft-driven motorcycle incorporating a swing arm support structure in which a portion of the swing arm is connected to a suspension link member attached to a lower portion of a vehicle body frame.

2. Description of the Background Art

There are several known support structures for a swing arm of a motorcycle. In general, such kwon structures for supporting a swing arm of the motorcycle include a swing arm swingably supported by a vehicle body frame via a pivot shaft; a suspension link connected between a lower portion of the vehicle body frame and the swing arm; and a rear shock absorber provided between the suspension link and an upper portion of the vehicle body frame.

Here, the motorcycle drives a rear wheel pivotally supported at a rear end of the swing arm through a drive shaft extending inside the swing arm. An example of known motorcycle having a swing arm support structure is disclosed in the Japanese Patent Application Publication No. 2002-87364.

According to the aforementioned conventional configuration of swing arm support structure, as disclosed in the he Japanese Patent Application Publication No. 2002-87364, a downwardly extending bracket is provided on a lower end portion of the swing arm, and a suspension link, for receiving an end portion the rear shock absorber, is connected to this bracket. For this reason, the ground clearance of the suspension link is reduced, making it difficult to maintain a sufficient ground clearance of the motorcycle.

From viewpoint of design, the position of the suspension cannot be lowered to a large extent. Accordingly, when design is made in consideration of performance such as ride comfort and the like, design flexibility of the suspension link is reduced.

The present invention has been made to overcome such drawbacks as discussed above. Accordingly, it is one of the objects of the present invention is to solve the problem involved in the aforementioned conventional technique, and to provide a motorcycle having an improved design flexibility of the suspension link while a ground clearance thereof being maintained.

SUMMARY OF THE INVENTION

In order to achieve the above objects, the present invention according to a first aspect thereof provides a motorcycle having a swing arm swingably supported by a vehicle body frame through a support member; a suspension link member connected between a lower portion of the vehicle body frame and the swing arm; and a rear shock absorber disposed between the suspension link member and an upper portion of the vehicle body frame.

Here, a rear wheel is pivotally supported by a rear end of the swing arm, and is driven by a drive shaft extending inside the swing arm. The drive shaft is operatively connected with an engine of the motorcycle. The suspension link member is connected between a portion of the swing arm and the lower portion of the vehicle body frame. A portion of the swing arm is raised by adjusting (shifting) the drive shaft upwardly towards the support member.

According to the present invention, the drive shaft is positioned upwardly towards (in the upper direction) of the support member so as to have the suspension link member connected between a portion of the swing arm and the lower portion of the vehicle body frame such that the suspension link member positioned from ground at an increased height. Accordingly, the ground clearance of the suspension link member is increased and design flexibility of the suspension link member is improved when design is made in consideration of ride comfort.

The present invention according to a second aspect thereof, in addition to the first aspect, is characterized in that the swing arm includes left and right arm members, the drive shaft extends inside one of the arm members, the one arm member is positioned upwardly (shifted to the upper direction) of the support member, the other one of the arm members is substantially perpendicular to the support member, intermediate portions of the respective arm members in a front-to-rear direction are connected to each other by a cross member extending obliquely downwardly from the one arm member to the other arm member, and the suspension link member is connected between an intermediate portion in a vehicle width direction of the cross member and the lower portion of the vehicle body frame.

According to such configuration of the second aspect of the present invention, the intermediate portions in a front-to-rear direction of the respective arm members are connected to each other by the cross member extending obliquely downwardly from the one arm member to the other arm member, and the suspension link member is connected between the intermediate portion in a vehicle width direction of the cross member and the lower portion of the vehicle body frame. Therefore, a ground clearance of the suspension link member can be easily increased, and design flexibility of the suspension link member is improved when design is made in consideration of ride comfort.

The present invention according to a third aspect thereof, in addition to the first aspect, is characterized in that the swing arm includes left and right arm members, the drive shaft extends inside one of the arm members, both the one arm member and the other arm member are shifted to the upper direction (positioned upwardly) of the support member, intermediate portions in a front-to-rear direction of the respective arm members are connected to each other by a cross member extending substantially horizontally from the one arm member to the other arm member, and the suspension link member is connected between an intermediate portion in a vehicle width direction of the cross member and the lower portion of the vehicle body frame.

According to such configuration of the third aspect of the present invention, both the one arm member and the other arm member may be shifted to the upper direction of the support member and the suspension link member is connected to the cross member extending substantially horizontally to connect the respective arm members; thus, ground clearance of the suspension link member is increased and design flexibility of the suspension link member is improved when design is made in consideration of ride comfort.

Further, the present invention according to a fourth aspect thereof, in addition to the first aspect, is characterized in that the swing arm includes a main arm member, the drive shaft extends inside the main arm member, the rear wheel is supported in cantilevered manner at a rear end of the main arm member, the swing arm includes a branched arm member branched substantially horizontally at a front end portion of the signal arm member, both the branched arm member and the main arm member shifted to the upper direction (positioned upwardly) of the support member, and the suspension link member is connected between a central branch portion where the branched arm member is branched from the main arm member, and the lower portion of the vehicle body frame.

According to such configuration of the fourth aspect of the present invention, even when the main arm member is provided, both the main arm member and the branched arm member are shifted to the upper direction of the support member so as to have the suspension link member connected to the central branch portion of the branched arm member with an increased height from the ground. Therefore, a ground clearance of the suspension link member is increased and design flexibility of the suspension link member is improved when design is made in consideration of ride comfort.

EFFECTS OF THE INVENTION

According to the present invention, the drive shaft is shifted to the upper direction (positioned upwardly) of the support member so as to have the suspension link member connected between a portion of the swing arm and the lower portion of the vehicle body frame, at an increased height from the ground. Thus, ground clearance of the suspension link member is increased and design flexibility of the suspension link member is improved when design is made in consideration of ride comfort.

Further, the respective arm members are connected to each other by the cross member extending obliquely downwardly from the one arm member to the other arm member, and the suspension link member is connected to the cross member. Accordingly, ground clearance of the suspension link member is increased, and design flexibility of the suspension link member is improved when design is made in consideration of ride comfort.

Further, both the one arm member and the other arm member are shifted towards the upper direction of the support member, and the suspension link member is connected to the substantially horizontally extending cross member to connect the respective arm members. Thus, ground clearance of the suspension link member is increased, and design flexibility of the suspension link member is improved when design is made in consideration of ride comfort.

Furthermore, even when the main arm member is provided, as discussed in the fourth aspect of the present invention, both the branched arm member and the main arm member are shifted to the upper direction of the support member so as to have the suspension link member connected to the central branch portion of the branched arm member with an increased height from the ground. Accordingly, design flexibility of the suspension link member is improved when design is made in consideration of ride comfort.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

The following description of the present invention explains illustrative embodiments of the present invention with reference to the attached drawings. In the following description, it should be noted that directions such as front and rear, right and left, and up and down are relative to a vehicle body.

Figure 1:
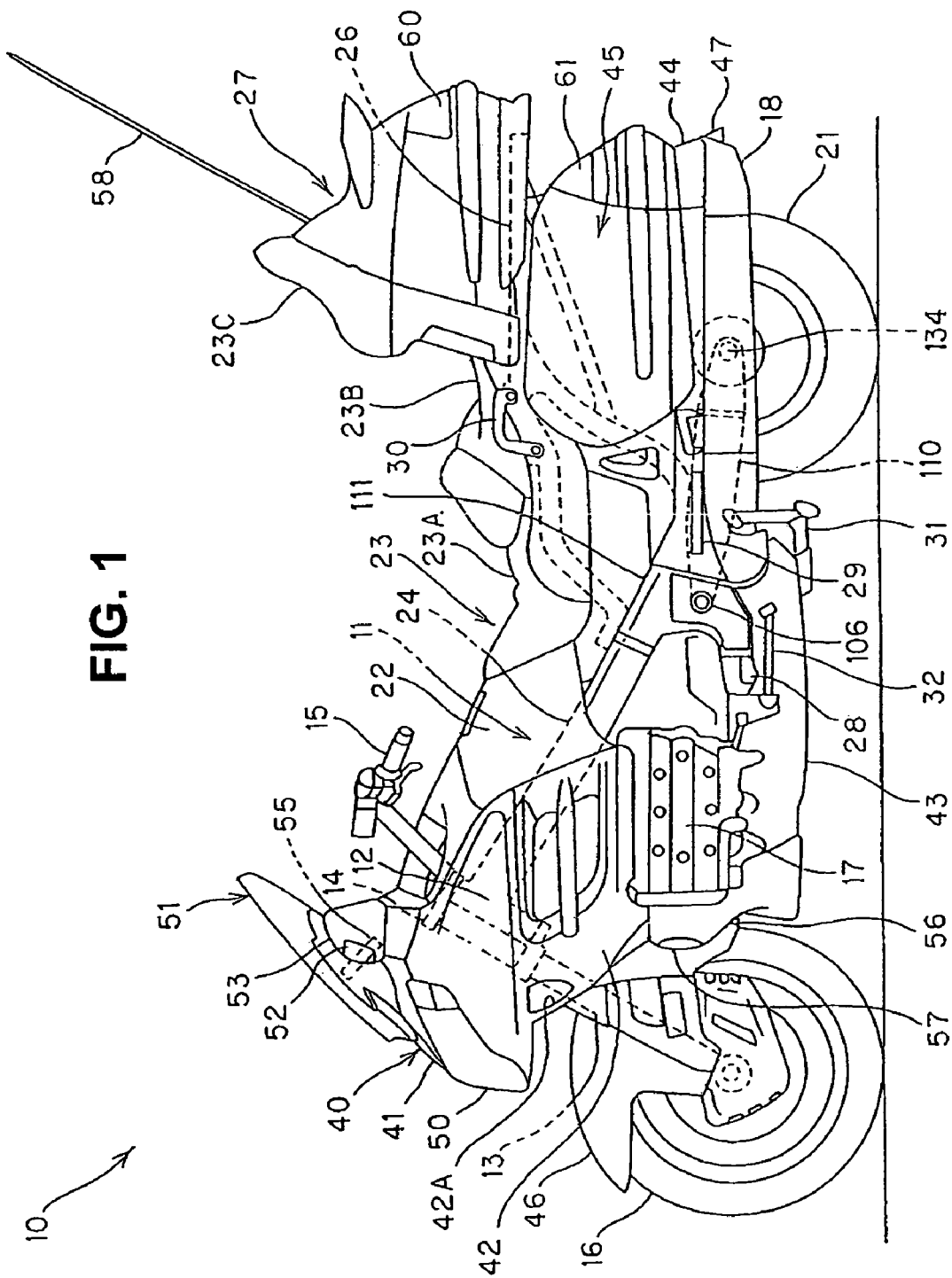
FIG. 1 is a side view of a motorcycle (large-sized) according to the present invention.
Figure 2:
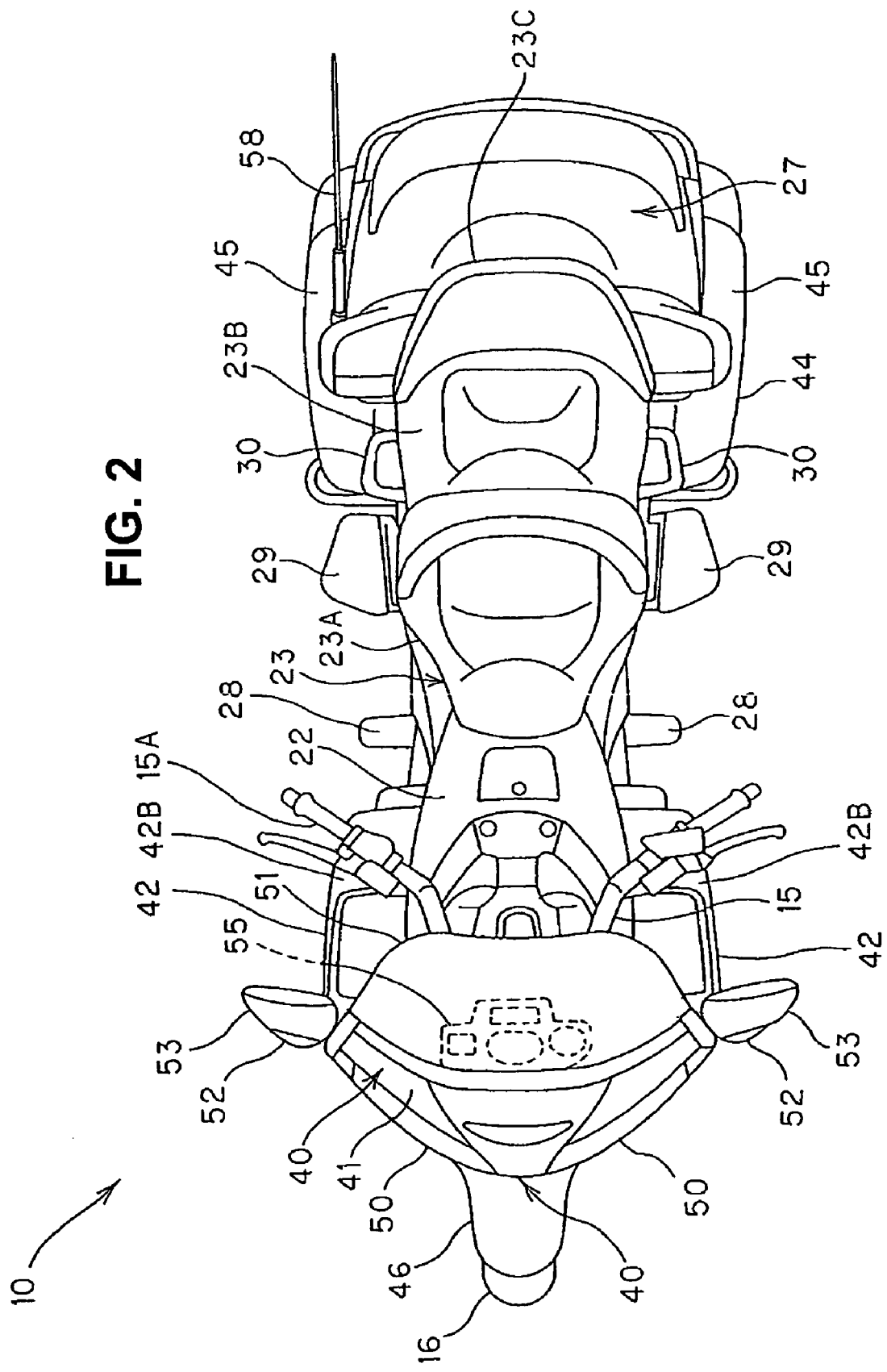
FIG. 2 is a top view of the motorcycle according to the present invention.

FIG. 1 is a side view of a large-sized motorcycle according to an illustrative embodiment of the present invention, and FIG. 2 is a top view of the motorcycle of the FIG. 1.

As shown in FIGS. 1 and 2, the motorcycle 10 includes a vehicle body frame 11; a pair of left and right front forks 13 rotatably supported by a head pipe 12 attached to a front end portion of the vehicle body frame 11; a steering handlebars 15, 15A attached to a top bridge 14 that supports upper ends of the front forks 13; a front wheel 16 rotatably supported by the front forks 13; an engine 17 supported by the vehicle body frame 11; an exhaust muffler 18 connected to the engine 17 through an exhaust pipe (not shown); a swing arm 110 swingably supported (allowing up and down movement) by a pivot shaft (support member) 106 of a rear lower portion of the vehicle body frame 11; and a rear wheel 21 rotatably supported by a rear end of the swing arm 110.

Figure 3:
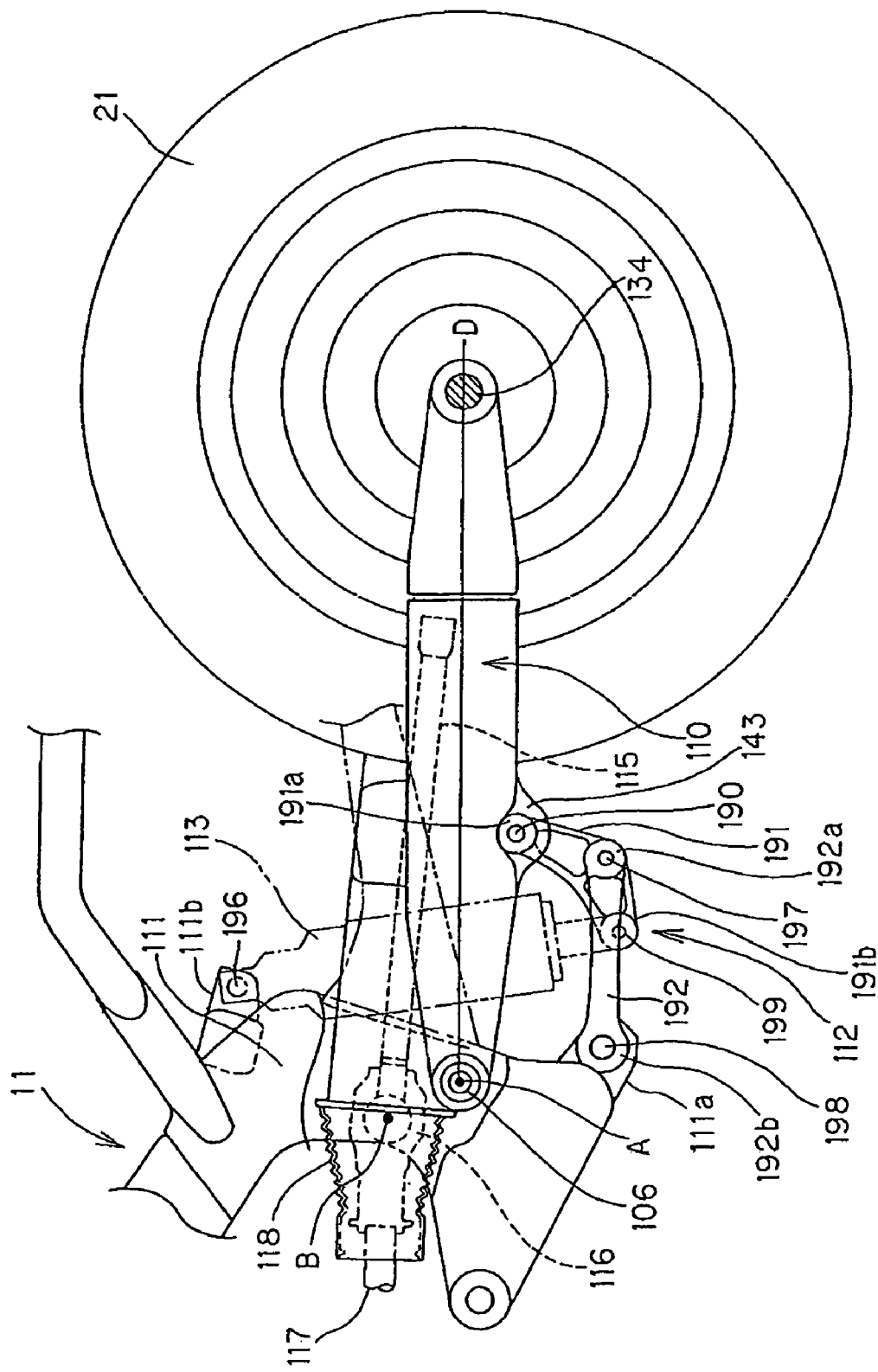
FIG. 3 is a side view of a rear wheel suspension portion of the motorcycle of FIG. 1.

In the motorcycle 10 of the present invention, as shown in FIG. 3, a rear shock absorber 113 is disposed between a suspension link member 112 connected to the swing arm 110 and the vehicle body frame 11.

The vehicle body frame 11 includes a pair of left and right main frames 24 that branch to the left and right from the head pipe 12 and extend obliquely downwardly in a rearward direction; a pair of left and right pivot plates 111 that are connected to rear portions of the respective main frames 24; and a pair of left and right seat rails 26 that extend obliquely upwardly in a rearward direction from the front and rear portions of the respective pivot plates 111.

The engine 17 is supported by the lower portions of the main frames 24, and a fuel tank 22 is supported above the main frames 24. A rider's seat 23 is provided on the upper portions of the seat rails 26, while a grab rail 30 and a trunk box 27 are attached to the rear portions of the seat rails 26.

The rider's seat 23 includes a front seat 23A, where a driver sits on, extends to the rear of the fuel tank 22; a rear seat 23B, where a fellow passenger sits on, is one step higher than the front seat 23A and is formed at the rear end portion of the front seat 23A; and a backrest member 23C for a fellow passenger.

A pair of left and right steps (foot rest steps) 28 for a driver, who sits on the front seat 23A, and a pair of left and right steps (foot rest steps for a fellow passenger) 29 for a fellow passenger, who sits on the rear seat 23B, are attached to the pivot plates 111 of the vehicle body frame 11. The grab rail 30, which the fellow passenger grabs, a main stand 31, a sub-stand 32 and a vehicle cowling 40 or the like (described later) are attached to the vehicle body frame 11.

The vehicle cowling 40 includes a front fairing 41 that covers the front portion of the vehicle; a pair of side covers 42 that covers the side portion of the vehicle body; an under cover 43 that covers the lower portion of the vehicle body; and a rear seat cowl 44 that covers the rear portion of the vehicle body.

In the vehicle cowling 40, the rear seat cowl 44 is provided with a pair of saddlebacks 45 which are integrally formed therewith. A front fender 46 that covers the front wheel 16 is attached to the front fork 13, while a rear fender 47 that covers the rear wheel 21 is attached to the rear seat cowl 44. It may be noted that the front fairing 41 and the pair of left and right side covers 42 may be integrally formed with each other.

A head light 50 is provided on a front surface of the front fairing 41. A wind screen 51 (for providing wind protection to an operator of the motorcycle) is attached to the upper portion of the front fairing 41. Left and right mirrors 53, each having a built-in front winker 52, are respectively provided at the left and right ends of the front fairing 41, while a vehicle meter 55 is provided inside the front faring 41, as shown in FIG. 2.

A pair of left and right air holes 42A for supplying outside air around the engine 17 from a vehicle front side is formed in the side covers 42. Further, the side covers 42 include an engine guard 56 provided on left and right front sides of the engine 17; and a pair of left and right fog lamp units 57 attached to the engine guard 56.

A pair of left and right side upper covers (appearance covers) 42B, which covers portions between the side covers 42 and the main frames 24 exposed to the external appearance, are attached to respective one of the side covers 42 (see FIG. 2). The side upper covers 42B prevent heat, produced as a result of operating the engine 17, from flowing into the passenger side through a gap between each side cover 42 and the vehicle body frame 11. The side upper covers 42B function as decorative covers. The side upper covers also cover an upper portion of a radiator (not shown).

Moreover, a pair of left and right tail lamp units 60 is provided on a rear portion of the trunk box 27, while a rear winker 61 is provided on the rear of each of saddle backs 45. A rod antenna 58 for receiving a radio broadcast for a built in audio unit (not shown) of the motorcycle 10 is provided on a right side portion of the trunk box 27. The rod antenna 58 may be used with non-built-in devices including audio receivers.

FIG. 3 shows a side view of a rear wheel suspension arrangement according to an illustrative embodiment of the present invention. The swing arm 110 is swingably supported by the support member (pivot shaft) 106 of the vehicle body frame 11. The swing arm includes a front end portion which is swingably supported by the support member 106 provided at the rear portion of the vehicle body frame 11, and a rear end portion on which the rear wheel 21 is rotatably supported by a rear wheel axle 134.

Figure 4:
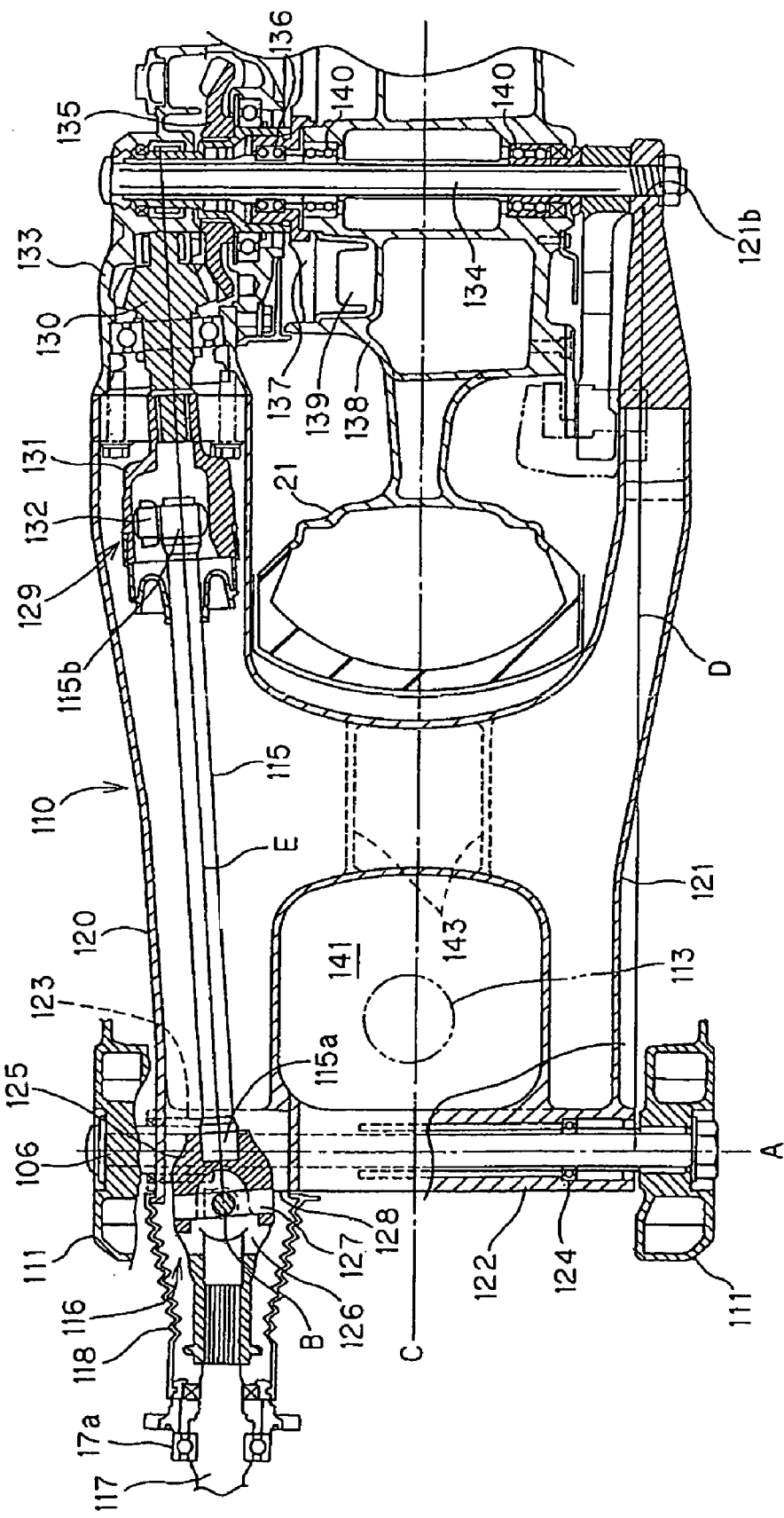
FIG. 4 is a plan cross-sectional view of the rear wheel suspension portion of the motorcycle of FIG. 1.

As shown in FIG. 4, the swing arm 110 further includes a pair of arm members having a hollow right arm member 120, and a left arm member 121. The right arm member 120 is open at its both ends in the front-to-rear direction so as to form a storing space (a hollow portion) for accommodating a drive shaft 115 therein. The drive shaft 115 is disposed in the hollow portion of the right arm member 120 and is longitudinally placed in the front-to-rear direction. A front end of the drive shaft 115 is connected to an output shaft 117 of the engine 17 through a universal joint 116.

As shown in FIG. 3, a center A of the pivot shaft 106 and a center B of the universal joint 116 are arranged such that they offset with each other in the front-to-rear direction and up-and-down direction. The center A is the center of swinging of the swing arm 110. The center B is the center of swinging of the universal joint 116, to be more specific, the center of swinging of the drive shaft 115 with respect to the output shaft 117, and an intersection point of two orthogonal axes of a cross shaft 127 (described later) of the universal joint 116. The center A is positioned at the rear of and below the center B.

A bellows-like boot 118 covers around both the output shaft 117 and the universal joint 116. A line D that connects the center A of the pivot shaft 106 to the center of the rear wheel axle 134 is a straight line.

The front ends of the respective arm members 120 and 121 are integrally connected to each other by a pivot member 122 placed in an elongated manner in a vehicle width direction. Both ends of the pivot member 122 in the length direction thereof serve as bearing members 123 and 124. The pivot shaft 106, which passes through both the bearing members 123 and 124 in the longitudinal direction, is supported at both the ends thereof by left and right pivot plates 111, as shown in FIG. 4. The bearing member 123 has a needle bearing, and the bearing member 124 has a ball bearing and a needle bearing.

The drive shaft 115 is disposed in the hollow portion of the right arm member 120 and is placed such that it is longitudinally oriented in front-to-rear direction. A first yoke 125, which forms the universal joint 116, is spline-connected to a front end 115a of the drive shaft 115. The first yoke 125 is connected to a second yoke 126 by the cross shaft 127. The rear end of the output shaft 117 is spline-connected to the second yoke 126. The output shaft 117 is supported by a bearing member 17a on the engine 17 side.

A front end of the boot 118 is engaged with the bearing member 17a. A rear end of the boot 118 is engaged around a front end opening portion 128 of the right arm member 120. An axis of the drive shaft 115 is denoted by a reference numeral E.

A vicinity portion, including the center B of the universal joint 116, is a portion where the diameter of the universal joint 116 reaches the maximum, and which serves as a connecting portion between each of the yokes 125 and 126 and the cross shaft 127. The vicinity portion including the center B extends forwardly from the right arm member 120. With such structure, it is possible to make the diameter of the front opening portion 128 of the right arm member 120 smaller than the maximum diameter of the universal joint 116. Moreover, the diameter of the right arm member 120 becomes smaller towards the rear side thereof from the center B.

A driving side bevel gear 130 is connected to a rear end 115b of the drive shaft 115 via a constant velocity joint 129.

The constant velocity joint 129 includes a joint cup 131, and a roller 132 provided on the rear end 115b of the drive shaft 115 fitted inside the joint cup 131. The joint cup 131 is operable to rotate as single unit along with the drive shaft 115, which causes the rear end 115b of the drive shaft 115 to move in an axial direction. Such a configuration makes it possible to absorb a stroke change caused when the swing arm 110 swings about the center A (the pivot shaft 106), which is different from the center B of the universal joint 116. It may be noted that known structures of various types can be applied to the constant velocity joint 129.

The bevel gear 130 is spline-connected to the joint cup 131 and meshed with a driven side bevel gear 135 provided on a rear wheel axle 134 in a gear box 133 attached to the rear end of the right arm member 120. The bevel gear 135 is bearing-supported on the rear wheel axle 134 via a bearing 136. An integral flange 137 is connected to a rear wheel hub (rear wheel) 138 through a damper 139.

The rear wheel hub 138 is bearing-supported on the rear wheel axle 134 via a bearing 140. One end of the rear wheel axle 134 is supported by the gear box 133, while the other end thereof passes through the hub 138 and is supported by the rear end of the left arm member 121. A driving force transmitted to the output shaft 117 from the engine 17 is transmitted through the universal joint 116 to the drive shaft 115, and is further transmitted through the constant velocity joint 129 from the bevel gear 130 to the bevel gear 135, and subsequently, transmitted from the flange 137 integral with the bevel gear 135 to the hub 138, and accordingly, the rear wheel 21 is driven, i.e., rotated about the rear wheel axle 134 by the power of the engine 17.

Figure 5:
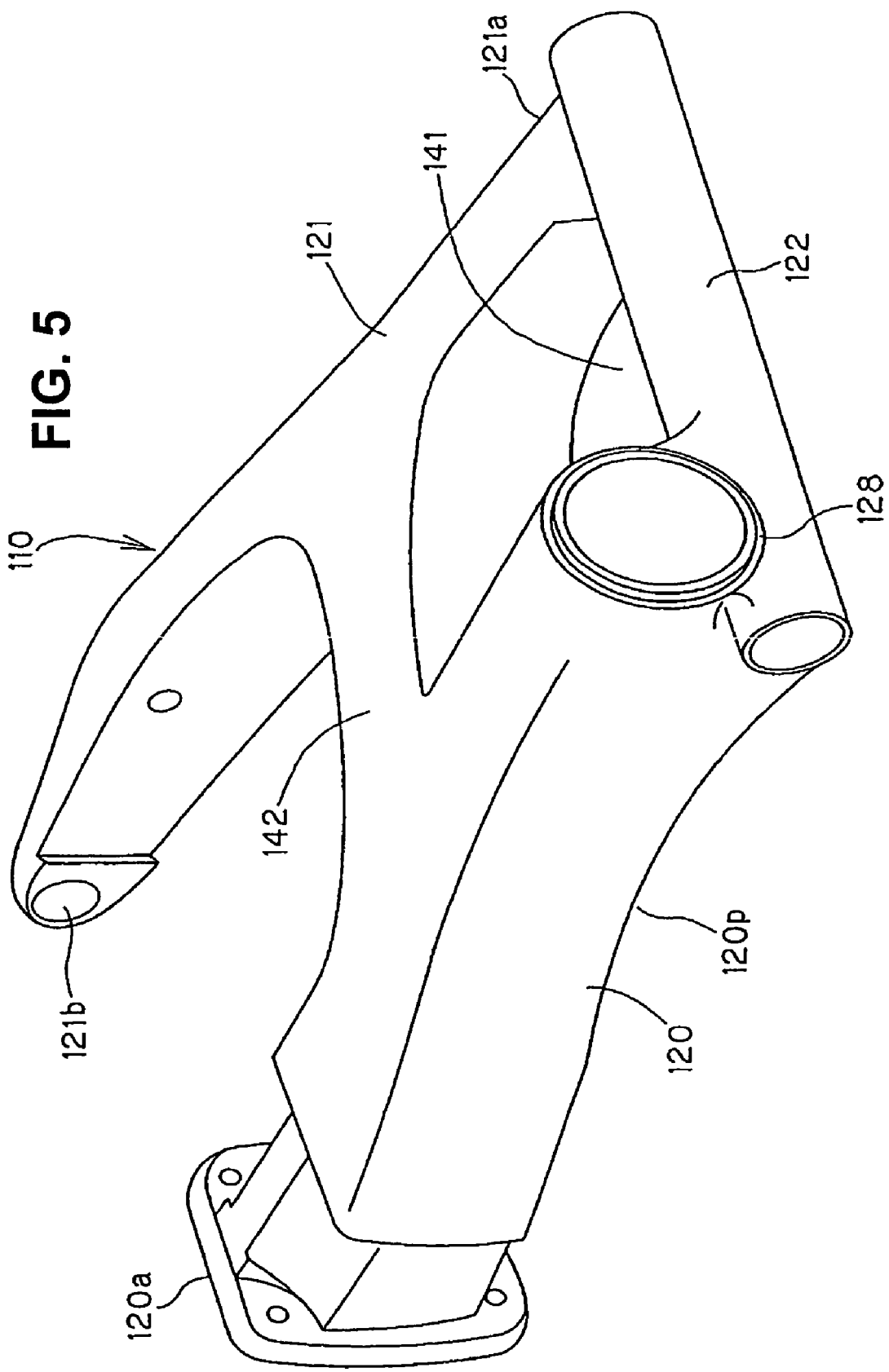
FIG. 5 is a perspective view of a swing arm.

FIG. 5 is a perspective view of the swing arm 110. The swing arm 110 is manufactured by an appropriate method such as casting or the like, by using a suitable material such as a light alloy and the like. The right arm member 120 is cylindrical member and has a substantially inverted V-shape or curve-shape when viewed in a side view. Accordingly, when assembled, an intermediate portion 120$p$ of the right arm member 120 is disposed at a higher position compare a position of a connection flange 120$a$ of the right arm member 120. The front end opening 128 is circular, and is positioned above the pivot member 122.

Regarding the outer periphery that encloses the front end portion 128, a lower wall is connected to the pivot member 122, so that a drive shaft storing portion and the pivot member 122 are vertically integrated with each other.

The left arm member 121 is pipe-shaped member and has a diameter less than a diameter of the right arm member 120. A front end 121$a$ of the left arm member 121 is substantially perpendicular to the pivot member 122. A front end portion of the right arm member 120 formed below the front end opening portion 128 and the front end of the left arm member 121 are integrally connected to each other via the pivot member 122. The intermediate portions of the respective arm members 120 and 121 including the higher intermediate portion 120$p$ of the right arm member 120 are integrally connected to each other via a cross member 142.

An opening 141, through which the rear shock absorber 113 (see FIG. 5) passes, is formed between the cross member 142 and the pivot member 122. The rear end of the right arm member 120 has the connection flange 120$a$ for connecting the right arm member with the gear box 133. An axle hole 121$b$ for receiving the rear wheel axel is formed in the rear end of the left arm member 121.

Figure 6:
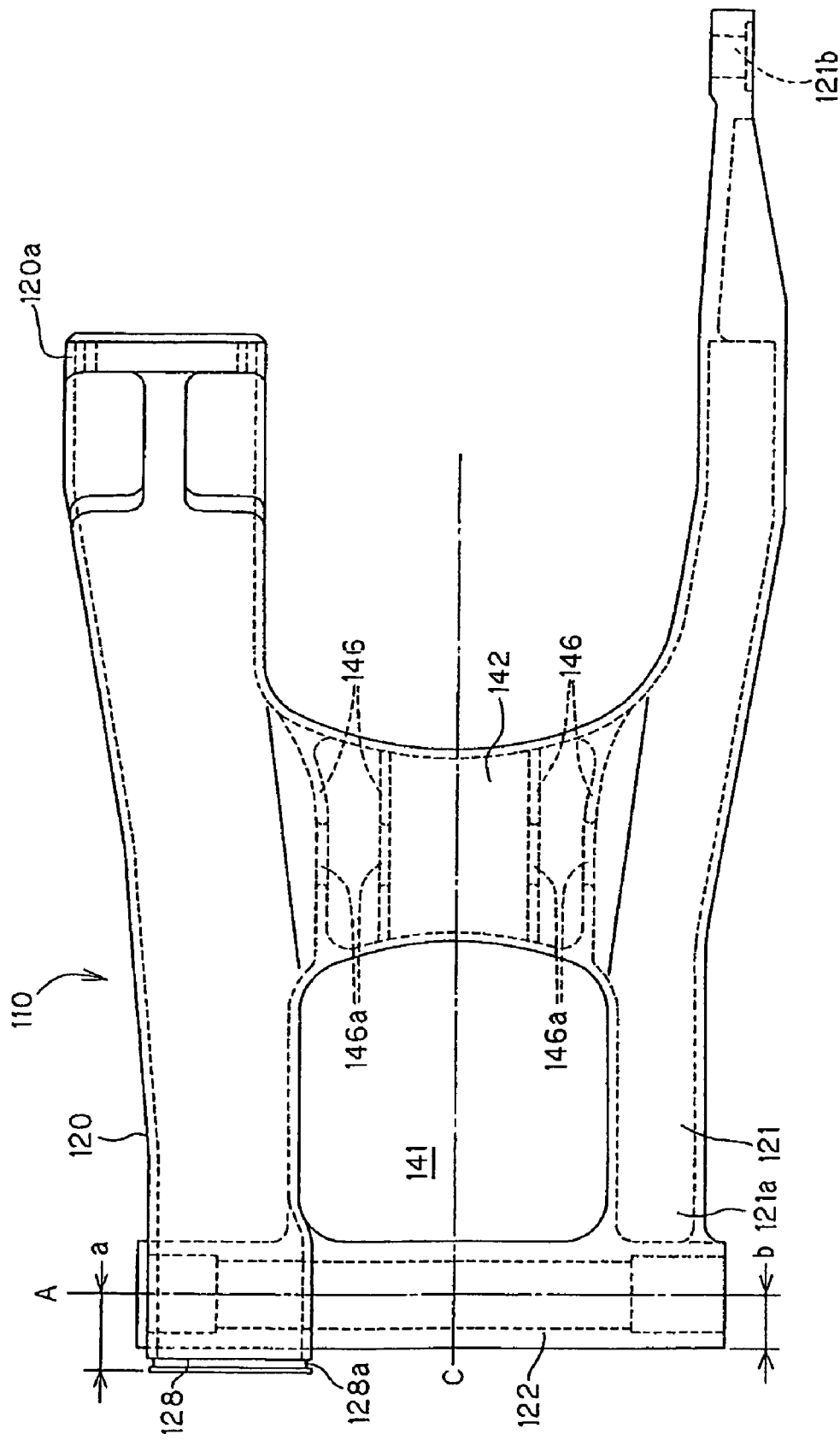
FIG. 6 is a plan view of the swing arm.
Figure 7:
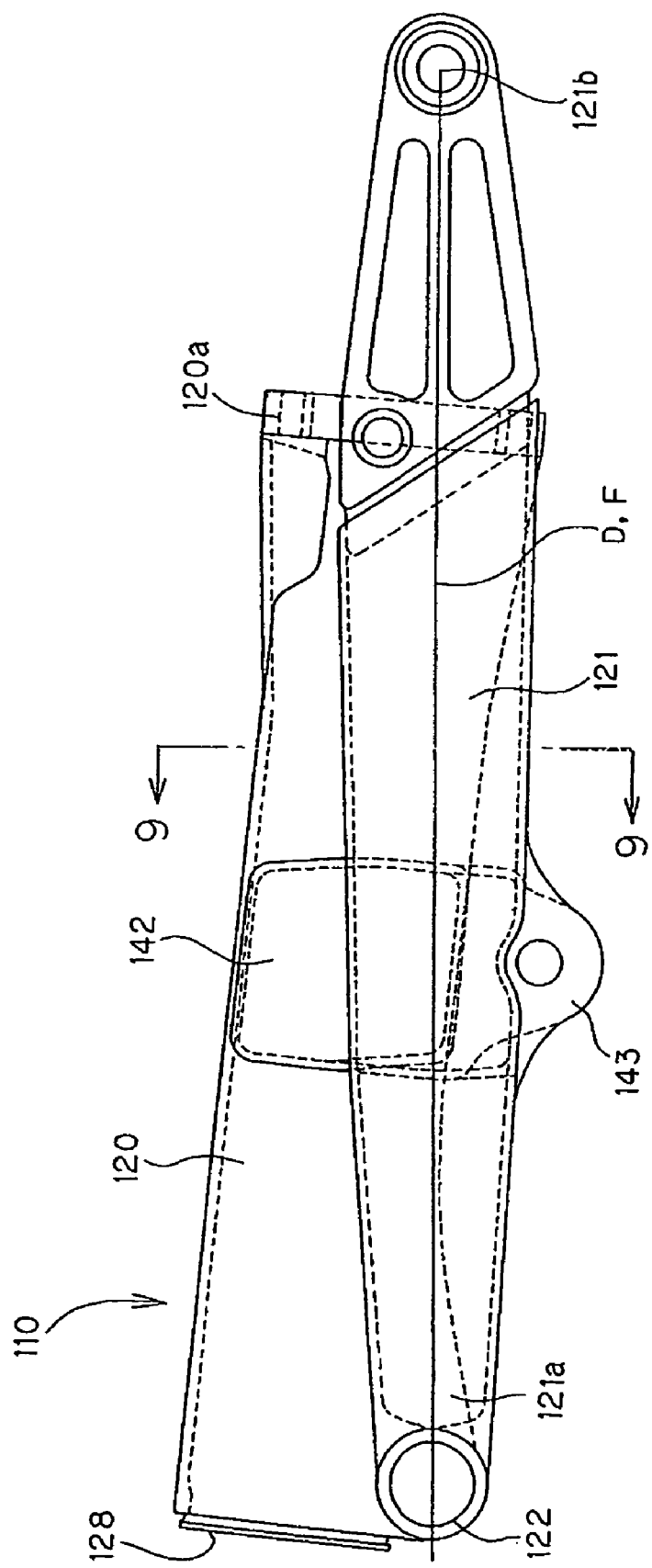
FIG. 7 is a left side view of the swing arm.
Figure 8:
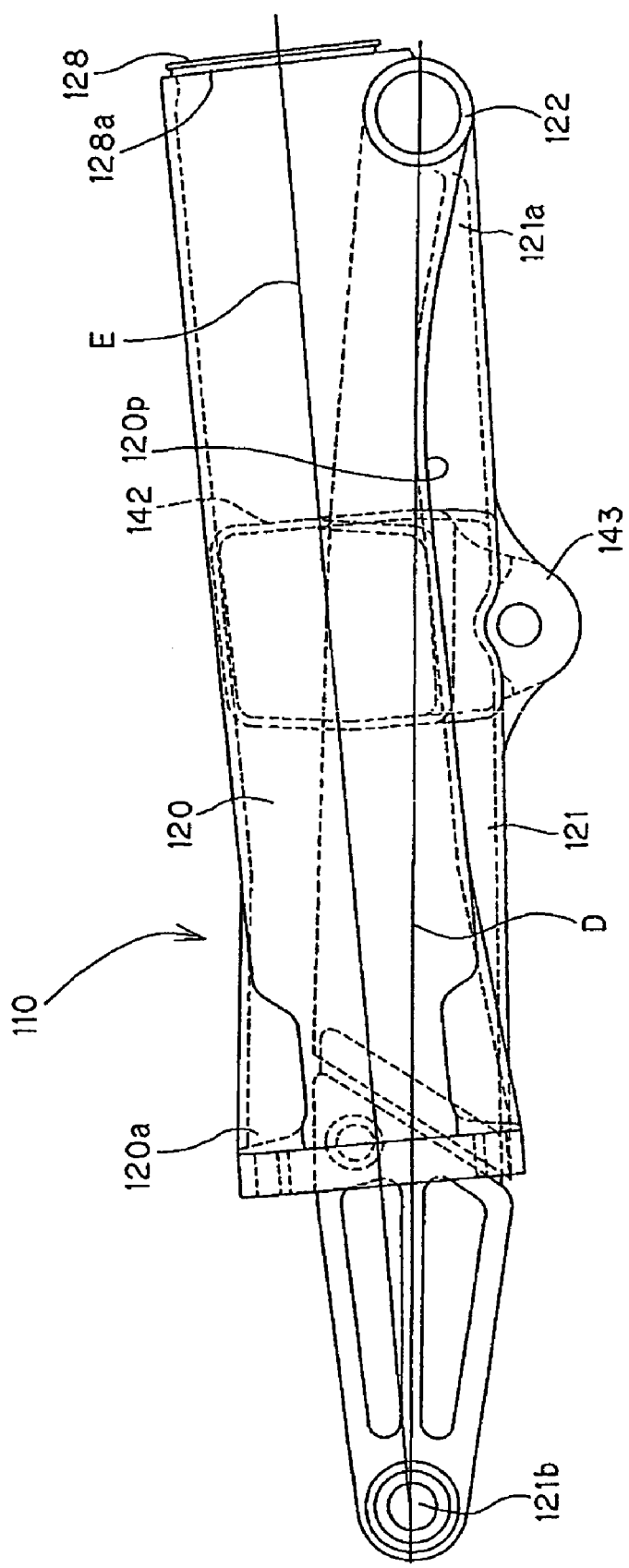
FIG. 8 is a right side view of the swing arm.
Figure 9:
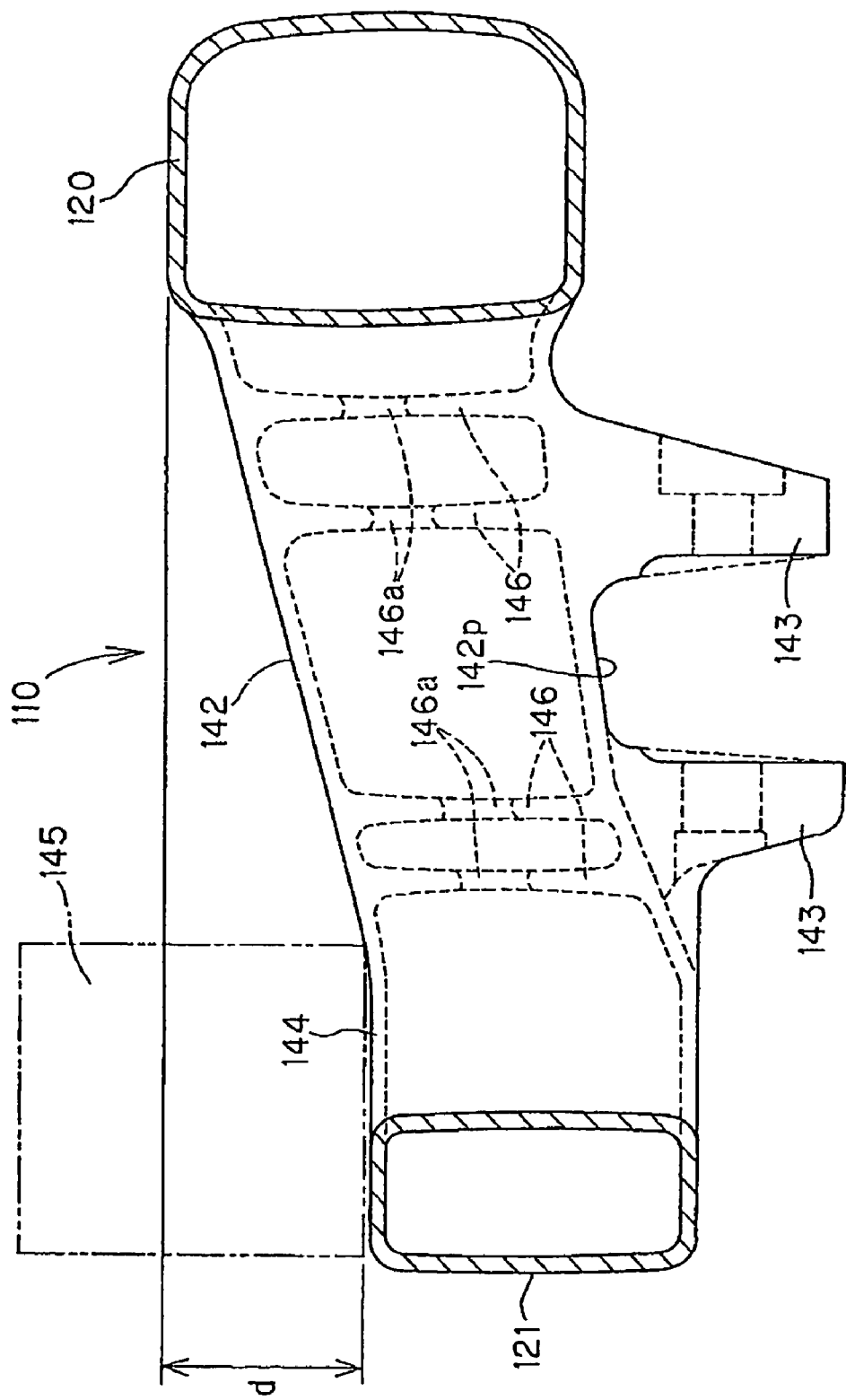
FIG. 9 is a cross-sectional view taken along a line 9-9 in FIG. 7.

Further description of swing arm 110 is provided in respect to FIGS. 6 through 9. FIG. 6 is a plan view of the swing arm 110, FIG. 7 is a left side view thereof, FIG. 8 is a right side view thereof, and FIG. 9 is a cross-sectional view taken along a line 9-9 in FIG. 7.

When viewed in a plan view (FIG. 6), it can be seen that, the right arm member 120 is thicker than the left arm member 121 and has a shorter rear side. The front opening portion 128 of the right arm member 120 extends a little more forward than the pivot member 122 thereof. A distance a between a central line A (conforming to an axis of the pivot shaft 106) of the pivot member 122 and the front end of the front end opening portion 128 is greater than a distance b between the front end of the left arm member 121 and the central line A, i.e., a>b.

It may be noted that the front end of the left arm member 121 conforms to the front end of the pivot member 122. As shown in FIG. 7, in a left side view of the swing arm 110, the right arm member 120 projects more upwardly than the left arm member 121 projects. Regarding the cross member 142, the right arm member 120 side is higher than the left arm member 121 side. A link stay 143 projected downwardly is integrally formed on a lower portion of the cross member 142.

As shown in FIG. 7, a central line F connecting the centers of left arm member in up-and-down and width directions substantially overlaps with a line D connecting the center of the pivot member 122 to the center of the axle hole 121$b$.

As shown in FIG. 8, in a right side view, a lower surface of the intermediate portion 120$p$ of the right arm member 120 is convexly curved upwardly. The intermediate portion 120$p$ in the front-to-rear direction is positioned more upwardly than the left arm member 121. Also, as to the cross member 142, the left arm member 121 side projects more downwardly than the right arm member 120 side projects. The pivot member 122 is integrally formed with the front end lower portion of the right arm member 120 and is open at end portions thereof.

As shown in FIG. 6, an engaging groove 128$a$ for the boot 118 is formed around the front end opening portion 128. An axis E of the drive shaft 115 is slightly inclined forwardly obliquely in an upward direction, while the line D is slightly inclined forwardly obliquely in a downward direction. Therefore, as shown in FIG. 8, the axis E intersects the line D on the center of the axle hole 121$b$. The axis E is positioned more upwardly than the line D at frontwardly side of the left arm member 121 than the center of the axle hole 121$b$.

As shown in FIG. 9, both the right arm member 120 and the left arm member 121 have substantially square cylindrical shapes. The right arm member 120 is larger than the left arm member 121 and expands upwardly in the vehicle width direction. Therefore, the cross member 142 is inclined downwardly from the right arm member 120 towards the left arm member 121. Also, when assembled, the upper surfaces of the left arm member 121 and the right arm member 120 are formed to have a difference in elevation therebetween, that is, a level difference d, so that the upper side of the left arm member 121 is disposed at a lower position in comparison to the upper side of the right arm member 120.

The upper surface of the left arm member 121, which is disposed at a lower position compared to that of the right arm member 120, may be used as a flat placement surface 144 for appropriately supporting an item such as a battery 145 or the like to reduce a vehicle height when the item is placed above the swing arm 110. A rib 146 reinforces the cross member 142 and projects inside the cross member 142 above the link stay 143. An opening 146$a$ for casting is formed on the rib 146 (see FIGS. 6 and 9).

In this embodiment, the drive shaft 115 is shifted to an upper direction of the pivot member 122 and the right arm member 120 that houses the drive shaft 115 is convexly curved upwardly in a substantially inverted V-shaped in a vehicle width direction, so that the cross member 142 is inclined upwardly from the left arm member 121 to the right arm member 120.

Accordingly, as shown in FIG. 9, a central portion 142$p$ of the cross member 142 is situated at a higher position than a position of the lower surface of the left arm member 121, in the vehicle width direction. The link stay 143 is attached to the higher central portion 142p of the cross member 142 in a vehicle width direction. The suspension link member 112 is directly connected to the link stay 143.

As shown in FIG. 3, the suspension link member 112 includes a substantially inverted V-shaped first link 191 having one end 191a thereof connected to the link stay 143 by a shaft 190; and a second link 192 having one end 192a thereof connected to an intermediate portion of the first link 191 by a shaft 197, and the other end 192b thereof connected to a lower end 111a of the pivot plate 111 by a shaft 198. In other words, the suspension link member is connected a lower portion of the vehicle body frame 11 via the other end 192b of the second link.

Further, as shown in FIG. 3, the other end 191b of the first link 191 is connected to the lower end of the rear shock absorber 113 by a shaft 199. The upper end of the rear shock absorber 113 is connected to an upper end 111b of the pivot plate 111 by a shaft 196. In other words, the upper end of the rear shock absorber 113 is connected with an upper portion of the vehicle body frame. The rear shock absorber 113 passes through the opening 141 (FIG. 5) formed in a front portion of the swing arm 110.

In this embodiment, the link stay 143 is attached to the central portion 142p of the cross member 142, which is inclined upwardly from the left arm member 121 to the right arm member 120, in the vehicle width direction. The suspension link member 112 is connected to the link stay 143.

Accordingly, the suspension link member 112 is connected at a position above the lower portion of the left arm member 121. Therefore, a position of the lower portion (or lower surface) of the suspension link member 112 from the ground can be elevated. Although performance of the suspension link member depends on each link design, since the lower surface position of the suspension link member 112 can be elevated, flexibility of each link design is improved without constraints of ground clearance.

Conventionally, a configuration has been proposed in which in order to increase ground clearance of a suspension link, a bracket is provided between the left and right swing arms or on the upper end surface of each swing arm, and the suspension link is connected from the lower portion of a vehicle body frame, through the swing arms, to the bracket. However, such conventional configuration requires a length of the suspension link to be increased, and the shape of parts of the suspension link becomes complicated, resulting in an increase in weight of parts as well as an increase in cost.

In contrast, according to the present invention, the swing arm 110 is integrally formed having the right and left arm members 120 and 121 and the cross member 142 by using a process involving casting. Thus, it is possible to easily form the swing arm 110 having a desired hollow integrated structure. Further, the drive shaft 115 is shifted to the upper direction of the pivot member 122. Thus, the width of the pivot member 122 is not restricted by dimensions of the drive shaft 115, thereby expanding the supporting span to the vehicle body frame 11.

Figure 10:
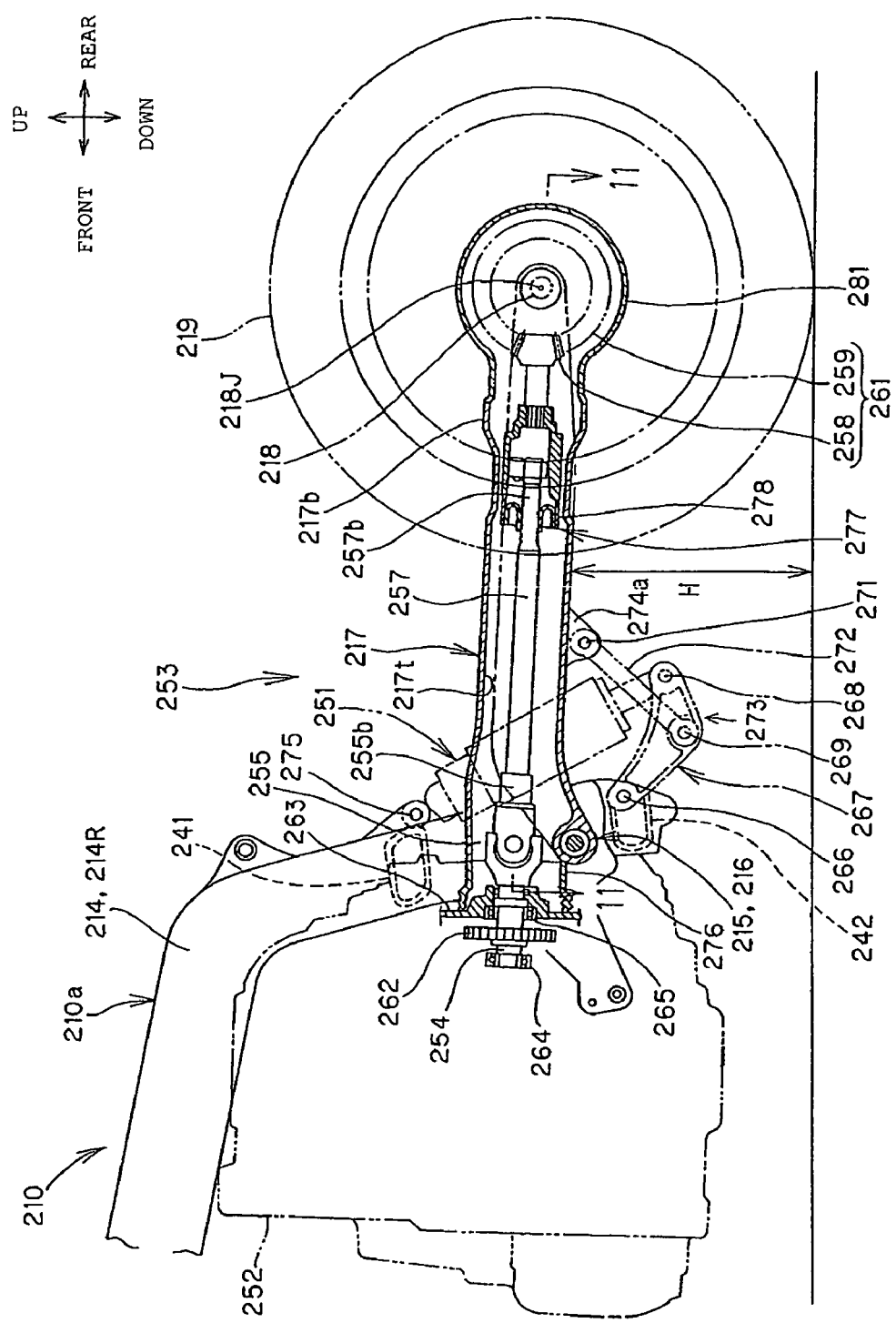
FIG. 10 is a side view of a rear wheel suspension portion of a motorcycle according another embodiment of the present invention.
Figure 11:
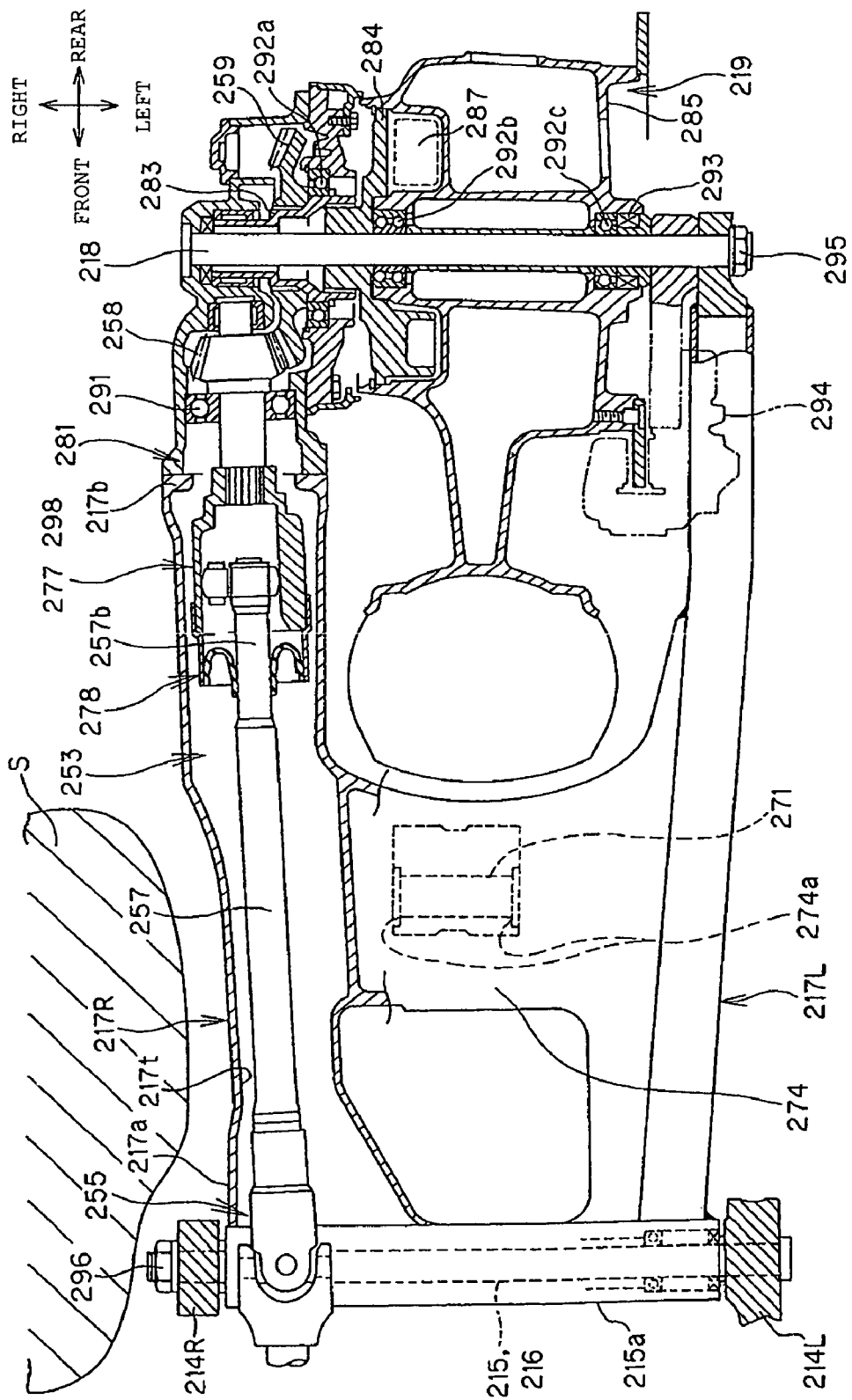
FIG. 11 is a cross-sectional view taken along a line 11-11 in FIG. 10.

FIG. 10 and FIG. 11 show another embodiment of a swing arm support structure of the present invention. FIG. 10 shows a rear portion of the motorcycle.

A motorcycle 210 includes a vehicle body frame 214 having a pair of vehicle body frames 214L and 214R (only 214R at an inner portion in the figure is illustrated); an engine 252 suspended on the vehicle body frames 214L and 214R; a pivot shaft 215, which serves as a support member 216, provided at the rear portion of the vehicle body frames 214L and 214R; a swing arm 217 swingably supported by the pivot shaft 215; a rear wheel 219 rotatably supported at the rear end of the swing arm 217 via a rear wheel axle 218; and a rear shock absorber 251 disposed between the suspension link 273 and the vehicle body frame 214.

The vehicle body frame 214 includes multiple cross members that are paired in left and right members which connect the left and right vehicle body frames 214L and 214R with each other. The support member 216 is disposed in an opening formed between the multiple cross connecting members, i.e., an opening is formed between an upper-side cross connecting member 241 and a lower-side cross connecting member 242. Such configuration of the vehicle body frame makes it possible to improve rigidity of the vehicle body frame 214 in vicinity of the support member 216, and further makes it possible to improve support rigidity of the swing arm 217.

A rear wheel drive mechanism 253 includes several structural elements including a universal joint 255 connected to an output shaft 254 of an engine 252 so as to transmit a driving force of the engine 252; a drive shaft 257 connected to a rear end 255b of the universal joint 255 so as to transmit the driving force of the engine 252; and a pair of final gear units 261 having a drive gear 258 connected to a rear end 257b of the drive shaft 257 so as to convert a direction of the driving force and transmit the resultant driving force to the rear wheel axle 218, and a driven gear 259.

An output gear 262 is operatively arranged on the engine gear 252. A power unit of the motorcycle includes a case 263 includes a transmission case and a case covering the engine 252. Bearings 264 and 265 support the output shaft 254.

FIG. 11 is a cross-sectional view taken along a line 11-11 in FIG. 10. The swing arm 217 includes left and right arm members 217L and 217R. The drive shaft 257 extends inside the right arm member 217R. End portions of both the right arm member 217R and the left arm member 217L are shifted towards the upper direction of a pivot member 215a, which stores the pivot shaft 215, and are connected to each other.

Intermediate portions in the front-to-rear direction of the respective arm members 217L and 217R are connected by a cross member 274 extending substantially horizontally from right arm member 217R to the left arm member 217L. A link stay 274a is attached to the lower portion of an intermediate portion of the cross member 274 in a vehicle width direction.

As shown in FIG. 10, a suspension link member 273 is connected to the link stay 274a and to the rear end lower portion of the vehicle body frame 214 between the vehicle body frames 214L and 214R.

The suspension link member 273 includes a first link 267 and a second link 272 attached to the first link 267. The first link is swingably arranged to extend rearwardly from the vehicle body frame 214 through a first swing shaft 266. A rear shock absorber 251 having a lower end thereof connected to a second swing shaft 268 is provided on the rear end of the first link 267, and an upper end thereof connected to a fifth swing shaft 275 is provided on the vehicle body frame 214. The second link 272 supporting the swing arm 217 is stretched between a third swing shaft 269 provided at a substantially intermediate portion of the first link 267, and a fourth swing shaft 271 provided at a substantially intermediate portion of the swing arm 217. A dust boot 276 is disposed between the swing arm 217 and the transmission case 263.

As shown in FIG. 11, the drive shaft 257 is disposed in a hollow portion 217t of the right arm member 217R. The drive shaft 257 has a shaft length variable mechanism 277 for varying (adjusting) the length of the shaft on its rear end.

A boot 278 is disposed between the shaft length variable mechanism 277 and the drive shaft 257. The boot 278 prevents foreign matter from getting into a connecting portion of the shaft length variable mechanism 277. The drive shaft 257 has the shaft length variable mechanism 277 which can adjust the length of the shaft. Therefore, it is possible to absorb shock movements in an axial direction of the drive shaft 257 by the shaft length variable mechanism 277 when the swing arm 217 swings.

Since the shaft length variable mechanism 277 includes the boot 278, even if it is moved in an axial direction, lubricating oil injected inside thereof can be hermetically sealed. A final gear case 281 houses the rear wheel axle 218 and its peripheral driving system components.

As shown in FIG. 10, the pivot shaft 215 serving as the support member 216, and an axis 218J of the rear wheel axle 218 are arranged substantially at the same height; while the rear wheel drive mechanism 253, that is, the universal joint 255 or the drive shaft 257 is arranged above the pivot shaft 215. Since the support member 216 is arranged substantially at the same height as the rear wheel axis 218J, it is possible to reduce a change in wheelbase when the swing arm 217 swings. Accordingly, a satisfactory vibration-damping performance can be obtained.

The rear wheel drive mechanism 253, that is, the universal joint 255 and/or the drive shaft 257 is arranged above the support member 216. Accordingly, it is possible to easily ensure positioning of the of the swing arm 217 at a height H from the ground. Since the drive shaft 257 is placed at a relatively high position above the pivot shaft 215, it is possible to increase a distance between each of the output shaft 254 and the output gear 262 connected to the drive shaft 257, and to suppress agitation of oil reserved in the lower portion of the engine 252.

As shown in FIG. 10, the universal joint 255 is formed between the output shaft 254 and the drive shaft 257. This universal joint 255 is arranged just above the pivot shaft 215 (the support member 216). Accordingly, it is possible to swing the drive shaft 257 according to swinging of the swing arm 217. Since, the universal joint 255 is provided between the output shaft 254 (derived from the engine 252 or the like), and the drive shaft 257, and is arranged just above the support member 216, it is possible to reduce a change in relative position between the drive shaft 257 and the swing arm 217 caused by swinging of the swing arm 217.

As shown in FIG. 11, a peripheral configuration of the rear wheel axle mainly includes a sleeve 283 rotatably arranged on a shoulder circumference of the rear wheel axle 218; a driven gear 259 integrally attached around the sleeve 283; a damper holder 284 integrally attached to the sleeve 283 and is provided to be rotatable with the rear wheel axle 218; and a damper member 287 disposed between the damper holder 284 and a rear wheel 285.

The sleeve 283 connects the driven gear 259 and the damper holder 284 to each other. A bearing 291 supports the drive gear 258. Bearings 292a, 292b and 292c support the rear wheel axle 21. Further, as shown in FIG. 11, the peripheral configuration of the rear wheel axle includes a seal member 293; a rear disc brake unit 294; and fastening nuts 295 and 296. With the peripheral configuration of the rear wheel axle, a driving force applied to the driven gear 259 is transmitted to the sleeve 283, the damper holder 284, the damper member 287, and the rear wheel 285, in this order, so that the rear wheel 219 is driven.

The axle length variable mechanism 277 is disposed in a rear portion 217b of the right arm member 217R. In such configuration, since the axle length variable mechanism 277 uses a tripod type constant velocity joint 298, although is not limited to this and a ball spline slip joint, a cross groove type joint may be used, there is no limitation in the configuration if the joint has a slide function. Since the axle length variable mechanism 277 is provided at the rear portion 217b of the right arm member 217R, it is possible to reduce an influence of heat from the engine 252 on the axle length variable mechanism to which the axle length variable mechanism 277 is subjected.

Further, since the axle length variable mechanism 277 is provided at the rear portion 217b of the right arm member 217R, it is possible to ensure a rider footrest space S without having to widen the front end 217a of the swing arm 217 in an axial direction. Although, according to an embodiment as shown in FIG. 11, the rear wheel drive mechanism 253 is hosed in the right arm member 217R, the rear wheel drive mechanism 253 may be housed in the left arm member 217L.

In the present embodiment, both the right arm member 217R and the left arm member 217L, which are connected to each other, are shifted to the upper direction of a pivot member 215a housing the pivot shaft 215. Accordingly, the central portion of the swing arm 217 in a vehicle width direction of the cross member 274 is disposed at a higher position than a position of a central portion of a conventional swing arm.

Here, the link stay 274a is attached at a higher central portion in the vehicle width direction, and the suspension link member 273 is connected to the link stay 274a. Accordingly, a position of the lower portion of the suspension link member 272 can be elevated above the ground. As to the suspension link performance, a position of the lower portion of the suspension link member 273 is higher compared to that of a conventional one. Thus, although performance of the suspension link member depends on design of each link thereof, the present invention provides improved flexibility of designing the suspension link member, including components thereof, without constraints with respect to ground clearance.

Figure 12:
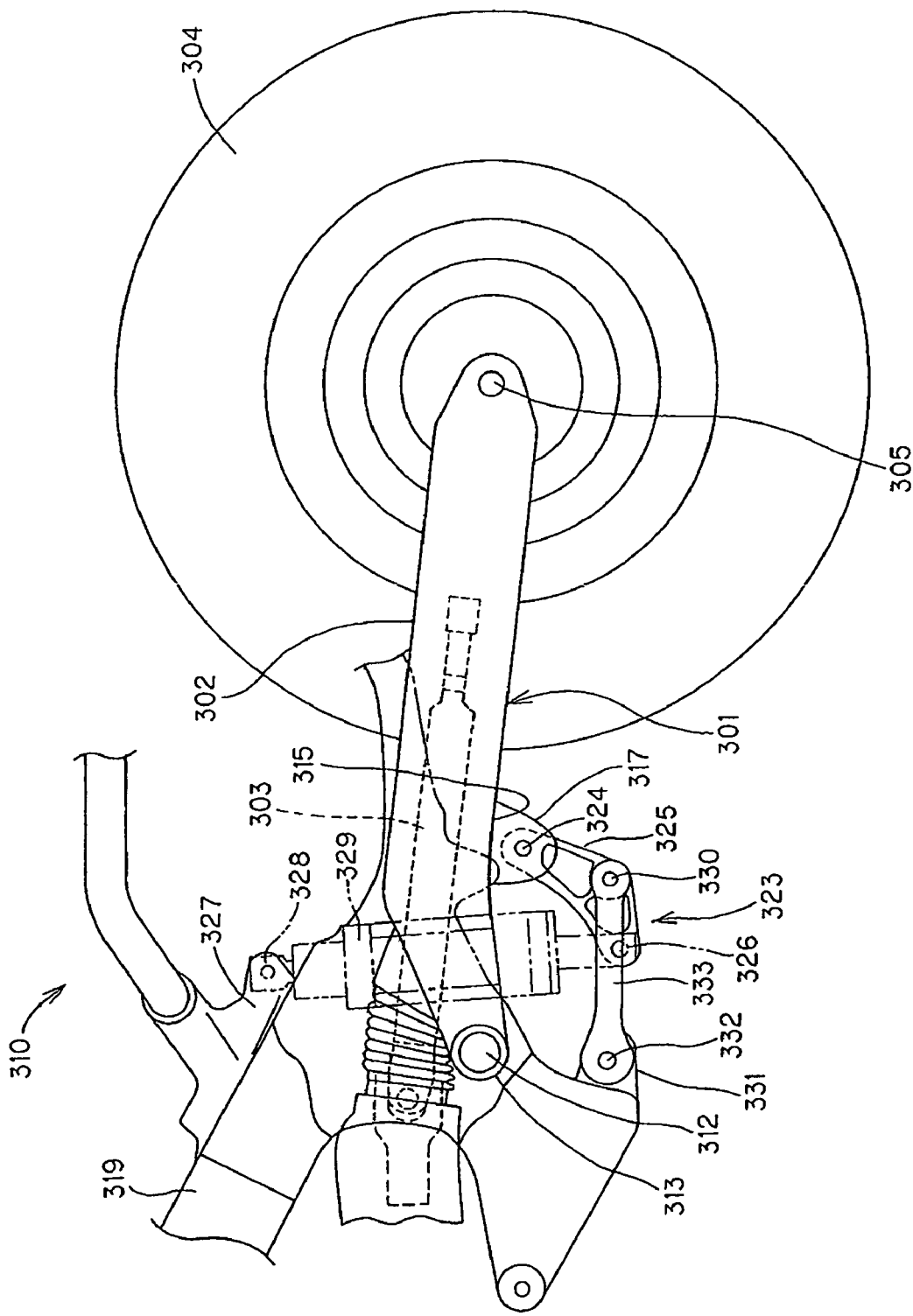
FIG. 12 is a view showing the rear portion of the motorcycle having a rear wheel cantilever support.
Figure 13:
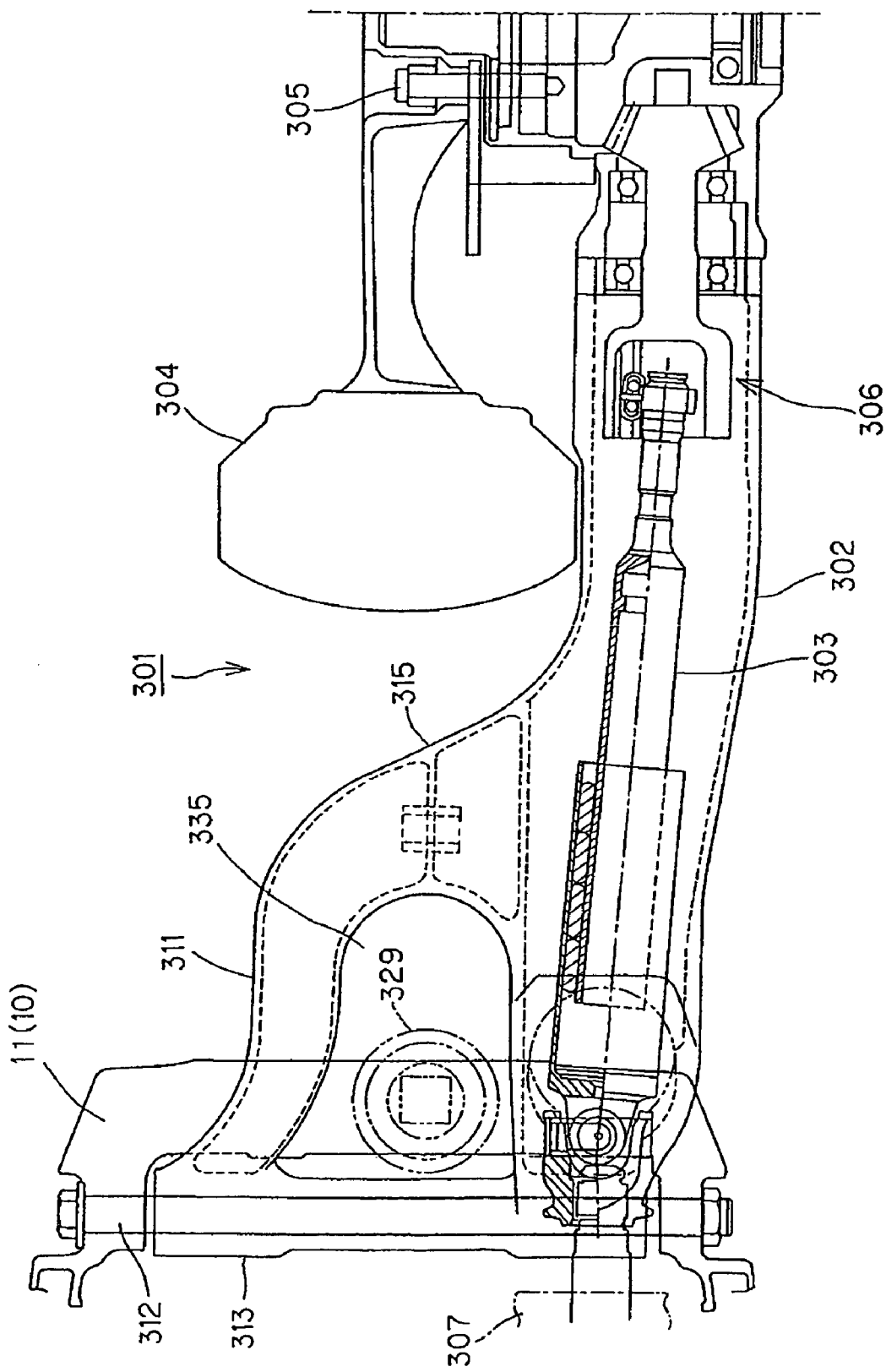
FIG. 13 is a plan cross-sectional view of the rear wheel suspension portion.

FIGS. 12 and 13 show another illustrative embodiment of the present invention. In the aforementioned embodiments, rear wheel support structures, in which the swing arm supports the rear wheel at the rear end by a so-called both-end support are explained. However, this embodiment illustrates a rear wheel support structure in which the swing arm supports the rear wheel at the rear end thereof using a cantilever support. In other words, according to the embodiment shown in FIGS. 12 and 13, the rear wheel of the motorcycle is supported in cantilevered manner by the swing arm.

As shown in FIG. 13, a swing arm 301 includes a main arm member 302. A drive shaft 303 connected to an engine 307 extends in a rear direction inside the main arm member 302, and is connected to a rear wheel 304 at the rear end of the arm member 302 through a power transmission mechanism unit 306.

The rear wheel 304 is supported in cantilevered manner with respect to the rear end of the arm member 302 via a rear wheel shaft 305. The swing arm 301 includes a branched arm member 311 branched in a plane where the main arm member 302 extends from the front end of the arm member 302 in a vehicle width direction, as shown in FIG. 13.

Here, both the branched arm member 311 and the main arm member 302 are shifted and extended to an upper direction of a pivot member 313 storing a pivot shaft 312, and top end of each of arms is connected to the pivot member 313, as shown in FIG. 12. A central branch portion 315 where the branched arm member 311 is branched is formed at a higher position. A link stay 317 is attached to lower portion of central branch portion 315. A suspension link member 323 is connected between the link stay 317 and a rear end lower portion 331 of a vehicle body frame 319.

The suspension link member 323 includes a first link 325 swingably extending forwardly from the link stay 317 through a first swing shaft 324, and a second link 333 stretched between a third swing shaft 330 provided at a substantially intermediate portion of the first link 325 and a fourth swing shaft 332 provided at a rear end lower portion 331 of the vehicle body frame 319.

A rear shock absorber 329 at a lower end thereof is connected to a second swing shaft 326 provided on the front end of the first link 325, and at an upper portion thereof is connected to a fifth swing shaft 328 provided on a rear end upper portion 327 of the vehicle body frame 319.

The rear shock absorber 329 passes through an opening 335 (FIG. 13) formed at the front portion of the swing arm 301.

In the present embodiment, both the main arm member 302 and the branched arm member 311 are shifted and extended to the upper direction of the pivot member 313 housing the pivot shaft 312, and each arm top end is connected to the pivot member 313, so that the central branch portion 315 of the branched arm member 311 is formed at a higher position, and the suspension link member 323 is connected to the higher central branch portion 315. Accordingly, it is possible to improve design flexibility of the suspension link member 323 when design is made in consideration of ride comfort.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle comprising:
   a vehicle body frame;
   a swing arm swingably supported on the vehicle body frame by a support member, the swing arm having a hollow bore formed therethrough;
   a drive shaft extending inside the hollow bore of the swing arm;
   a suspension link member extending between a lower portion of the vehicle body frame and the swing arm; said suspension link member comprising a plurality of links;
   a rear shock absorber disposed between the suspension link member and an upper portion of the vehicle body frame; and
   a rear wheel rotatably supported on a rear end of the swing arm, and operatively driven by the drive shaft;
   wherein the suspension link member is connected between a portion of the swing arm and the lower portion of the vehicle body frame, such that the portion of the swing arm is operable to be selectively raised by shifting the drive shaft above the support member; and
   wherein an end portion of one of the links of the suspension link member, extending from the swing arm, is connected with a lower end of the shock absorber.

2. A motorcycle according to claim 1, wherein:
   the swing arm includes first and second arm members, and a cross member extending between the arm members;
   the drive shaft extends inside the first arm member;
   the first arm member is situated above the support member;
   the second arm member is substantially perpendicular to the support member;
   intermediate portions of the respective arm members are connected to each other by the cross member extending obliquely downwardly from the first arm member to the second arm member; and
   the suspension link member is connected between an intermediate portion of the cross member and the lower portion of the vehicle body frame.

3. A motorcycle according to claim 1, wherein:
   the swing arm includes left and right arm members, and a cross member extending between the arm members;
   the drive shaft extends inside one of the left and right arm members;
   both of said left and right arm members are positioned above the support member;
   intermediate portions of the respective arm members are connected to each other by said cross member extending substantially horizontally therebetween; and
   the suspension link member is connected between a central portion of the cross member and the lower portion of the vehicle body frame.

4. A motorcycle according to claim 1, wherein:
   the swing arm comprises a main arm member and a branch member which is substantially horizontally branched from the main arm member at a central branch portion at a front end of the swing arm;
   the drive shaft extends inside a portion of the main arm member;
   the rear wheel is supported in a cantilevered manner at a rear end of the main arm member;
   both the main arm member and the branched arm member are positioned above the support member; and
   the suspension link member is connected between the central branch portion of the swing arm and the lower portion of the vehicle body frame.

5. A motorcycle according to claim 1, wherein:
   said portion of the swing arm includes a link stay formed thereon;
   said plurality of links of the suspension link member includes a first link, and a second link connected to the first link;
   said first link has one end thereof operatively connected with said link stay, and the other end thereof connected with said rear shock absorber; and
   said second link has one end thereof connected to an intermediate portion of the first link, and the other end thereof connected to said lower portion of the vehicle body frame.

6. A motorcycle according to claim 1, wherein:
   said portion of the swing arm includes a link stay formed thereon;
   said plurality of the links of the suspension link member includes a first link and a second link connected to the first link;
   said first link comprises a first swing shaft, a second swing shaft and a third swing shaft located between said first swing shaft and second swing shaft;
   said first swing shaft is operatively connected to said link stay of the of the swing arm;
   said second swing shaft is connected with said rear shock absorber; and
   the second link has a first end connected to said third swing shaft of the first link; and a second end connected with said lower portion of the vehicle body frame.

7. A motorcycle comprising:
   a vehicle body frame having a support member formed thereon;
   a swing arm swingably supported at front end portion thereof by said support member of the vehicle body frame, said swing arm having a rear end portion rotatably supporting a rear wheel of the motorcycle, said swing arm having a hollow bore formed therethrough and having a link stay integrally formed thereon;

a suspension link member operatively connected between the link stay of the swing arm and a lower portion of the vehicle body frame, said suspension link member comprising a plurality of links; and a rear shock absorber disposed between the suspension link member and an upper portion of the vehicle body frame;

wherein:

the rear wheel of the motorcycle is driven by a drive shaft extending through the hollow bore of the swing arm; said drive shaft operatively connected to an engine of the motorcycle;

the suspension link member is configured such that the portion of the swing arm housing the drive shaft therein is positioned above the support member of the vehicle body frame; and wherein an end portion of one of the links of the suspension link member, extending from the swing arm, is connected with a lower end of the shock absorber.

8. A motorcycle according to claim 7, wherein:

the swing arm includes a pair of arm members, and a cross member disposed between said arm members; one of said arm members having said hollow bore formed therein;

said one of the arm members is arranged upwardly of the support member;

the other one of the arm members is substantially perpendicular to the support member;

intermediate portions of the respective arm members are connected to each other by the cross member extending obliquely downwardly from the one arm member to the other arm member; and the suspension link member is connected between an intermediate portion of the cross member and the lower portion of the vehicle body frame.

9. A motorcycle according to claim 7, wherein the swing arm includes a pair of arm members, and a cross member disposed between said arm members; one of said arm members having said hollow bore formed therein;

both the one arm member and the other arm member are positioned above the support member;

intermediate portions of the respective arm members are connected to each other by the cross member extending substantially horizontally between the left and right arm members; and the suspension link member is connected between a central portion of the cross member in a vehicle width direction and the lower portion of the vehicle body frame.

10. A motorcycle according to claim 7, wherein:

the swing arm includes a main arm member having said hollow bore formed therein, and a branched arm member branched off of a front end of the main arm member defining a central branch portion;

the rear wheel is supported in a cantilevered manner at a rear end of the main arm member;

both the branched arm member and the main arm member are positioned above the support member; and the suspension link member is connected between the central branch portion of the swing arm and the lower portion of the vehicle body frame.

11. A motorcycle according to claim 7, wherein:

said link stay is formed on an outer central portion of the swing arm;

said plurality of link of the suspension link member includes a first link, and a second link connected to the first link;

said first link has one end thereof operatively connected with said link stay, and the other end thereof connected with said rear shock absorber; and said second link having one end thereof connected to an intermediate portion of the first link, and the other end thereof connected to said lower portion of the vehicle body frame.

12. A motorcycle according to claim 7, wherein:

said portion of the swing arm includes a link stay formed thereon;

said plurality of links of the suspension link member includes a first link, and a second link connected to the first link;

said first link has a first swing shaft, a second swing shaft and a third swing shaft formed between said first swing shaft and second swing shaft;

said first swing shaft is operatively connected to said lower portion of the vehicle body frame;

said second swing shaft is connected with said rear shock absorber; and one end portion of the second link is connected said third swing shaft of the first link; and the other end portion the second link is connected with said link stay.

13. A motorcycle according to claim 7, wherein said support member includes a pivot shaft provided at a rear portion of the vehicle body frame, and wherein said swing arm is pivotally supported by the pivot shaft.

14. A motorcycle according to claim 7, wherein:

said vehicle body frame comprises a pivot plate;

said upper portion of the vehicle body frame includes an upper end portion of the pivot plate, and said lower portion of the vehicle body frame includes a lower end portion of the pivot plate;

said upper end portion of the pivot plate directly and pivotally supports one end portion of the rear shock absorber; and said lower end portion of the pivot plate pivotally supports an end portion of said suspension link member.

* * * * *